United States Patent [19]
Archer et al.

[11] Patent Number: 6,018,468
[45] Date of Patent: Jan. 25, 2000

[54] MULTI-RESONANT DC-TO-DC CONVERTER

[75] Inventors: Michael P. Archer, Westlake Village, Calif.; James S. Dinh, Gig Harbor, Wash.

[73] Assignee: Eos Corporation, Del.

[21] Appl. No.: 08/838,328

[22] Filed: Apr. 8, 1997

[51] Int. Cl.[7] .................................................. H02M 3/335
[52] U.S. Cl. ............................................. 363/17; 363/132
[58] Field of Search .................................. 363/15, 16, 17, 363/131, 132

[56] References Cited

U.S. PATENT DOCUMENTS

| | | | |
|---|---|---|---|
| 3,965,408 | 6/1976 | Higuchi et al. | 363/15 |
| 4,774,649 | 9/1988 | Archer | 363/131 |
| 5,073,849 | 12/1991 | Morris | 363/131 |
| 5,485,362 | 1/1996 | Archer | 363/134 |

*Primary Examiner*—Jeffrey Sterrett
*Attorney, Agent, or Firm*—Seldon & Scillieri, LLP

[57] ABSTRACT

A DC-to-DC converter, comprising: inverter means for receiving a DC input and providing as an output a high-frequency, alternately pulsed current waveform; a control winding for receiving the output of the inverter means, the control winding being wound on a common bobbin with first and second tank windings, the windings de-coupled on the bobbin so that there is a significant leakage inductance between the windings, the first and second tank windings having two discrete resonant frequencies on a common core and flux path, a main primary winding wound in series with the control winding, the main primary winding being wound onto a separate bobbin and residing on its own core leg and flux path, first and second secondary windings coupled with the main primary winding, the first and second secondary windings being wound out of phase with each other, the first and second secondary windings feeding, respectively, first and second diodes, the first and second diodes rectifying the alternately pulse current waveform generated by high-frequency operation of the inverter means.

3 Claims, 6 Drawing Sheets

TANK WINDING L1
CONTROL WINDING
TANK WINDING L2

MULTI-RESONANT DC-TO-DC CONVERTER

BACKGROUND OF THE INVENTION

1. Technical Field

The present invention relates generally to field of power processing circuits, and in particular to DC-to-DC converters.

2. Background Art

Forced commutation converters like flyback and forward topologies are well documented in the art and in many published papers. These converters are well described, for example, in *Switching Power Supply Design*, by Abraham Pressman.

Resonant converters have been described in the art for many years. These converters are currently in production in many major computer applications and are enjoying success due to their high packaging density and high operating efficiencies. State-of-the-art resonant converters are free from switching losses and noise generated via the interruption of current or voltage, as those converters are operating in an essentially "zero-current/zero-voltage" configuration. One such prior-art converter, shown in FIG. 1, is described in Archer, U.S. Pat. No. 5,485,362, which is incorporated herein by reference.

Today's demanding power environment continues to push for higher efficiency and smaller packages.

SUMMARY OF THE INVENTION

The present invention provides a novel resonant topology, which utilizes multiple different resonances to achieve a complex zero-current-switching (ZCS) current waveform. This novel waveform exhibits much lower RMS values than the conventional pulsed sine wave current of previous resonant converters, allowing higher efficiency operation while using smaller magnetic and filtering components.

DESCRIPTION OF SPECIFIC EMBODIMENTS

There are many factors that affect efficiency in power converters. Forced commutation converters suffer from switching losses, resonant converters suffer from residual tank losses, and both types of converters can have efficiency compromised by practical design requirements. These include, to name a few, density, which limits transformer size, and material cost, which leads to the use of higher ESR capacitors and less efficient core materials or wire constructions. These types of design parameters tend to change from application to application, and it is therefore not fruitful to address each of them in detail.

There are, however, fundamental relationships which transcend these implementation issues. All power processing topologies ultimately have their efficiency determined by the relationship of the RMS currents flowing through the high-frequency portion of the DC-to-DC converter as a function of the DC output current. Square-wave currents are more efficient than pulsed sine waves, given the same dead time, as the peak current is lower for the same rectified and demodulated DC output current. This means that regardless of which type of topology a design uses, it is desirable to reduce the RMS current for any given output current.

Figure 2A:
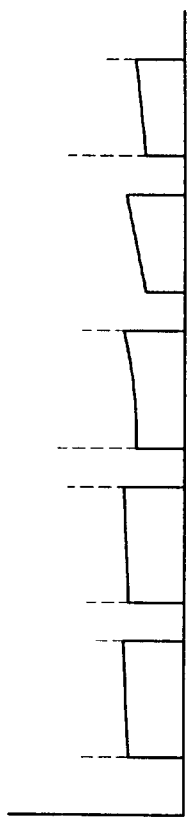
FIGS. 2(a) and 2(b) show diode current waveform shapes for, respectively, a prior-art square-wave converter and a prior-art resonant converter.
Figure 2B:
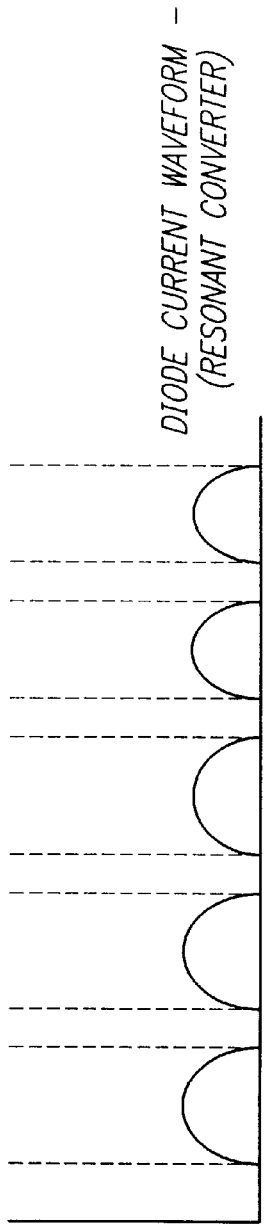

A review of advanced resonant converters demonstrates one area for efficiency improvement. FIGS. 2(a) and 2(b) show, respectively, the current waveforms for a prior-art resonant converter, and a prior-art square-wave converter. As is apparent from a comparison of the two figures, the waveform for the resonant converter has a higher peak current than the waveform for a conventional square-wave converter. The disadvantage of the higher peak current in the resonant converter is more than offset by the advantageous switching arrangement used in the resonant converter. However, if the relationship of RMS to DC output current is improved in the resonant converter, the efficiency of the resonant converter will increase continue to increase.

Figure 1:
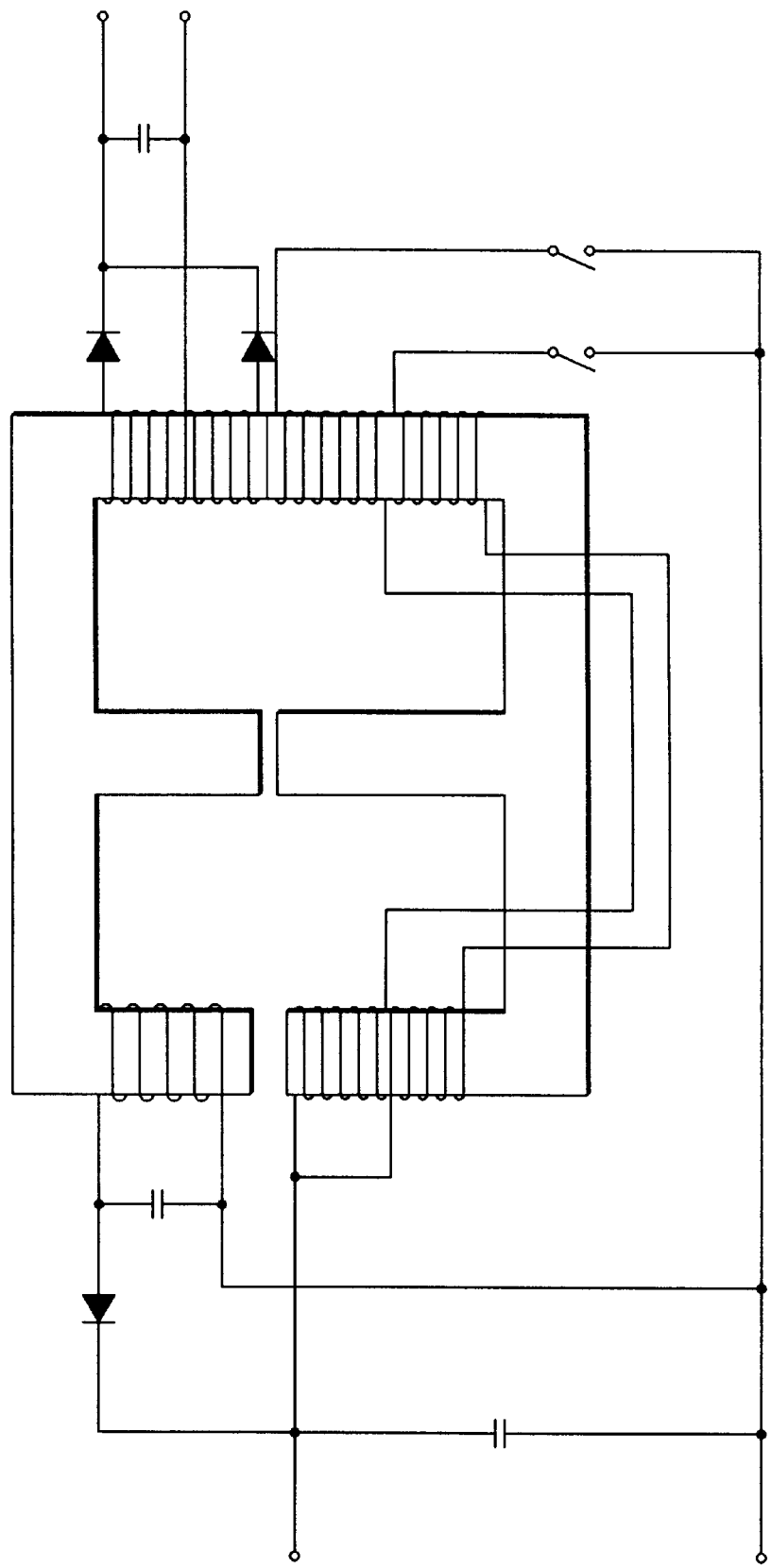
FIG. 1 shows a circuit drawing of a resonant converter according to the prior art.

In state-of-the-art resonant design, such as that shown in FIG. 1, the currents flowing through the converter are shaped by the influence of the flux in the transformer. The flux is sinusoidal under the influence of a resonant circuit (i.e., a tank circuit) which is resonating in response to a bridge drive oscillation circuit programmed to be above the natural frequency of the tank. FIG. 5 shows the equivalent electrical circuit, derived through dual permeance modeling. The equivalent circuit is a series parallel circuit, with the series inductance being either the control winding plus series leakage inductance or series leakage inductance only, depending on the implementation. See also Archer, U.S. Pat. No. 5,485,362, and Archer, U.S. Pat. No. 4,774,649, both of which are hereby incorporated by reference. The series parallel implementation enables the frequency modulation range to be very small, typically less than 10 kHz. This is important to control the magnetizing current in the primary to reasonable levels and facilitate zero-voltage switching (ZVS) operation.

Under the principles of Fourier mathematics, any periodic waveform can be reproduced through the addition of sine and cosine waves of different frequencies. In the present invention, this relationship is utilized to create a waveform with a desirable RMS current relationship.

Figure 5A:
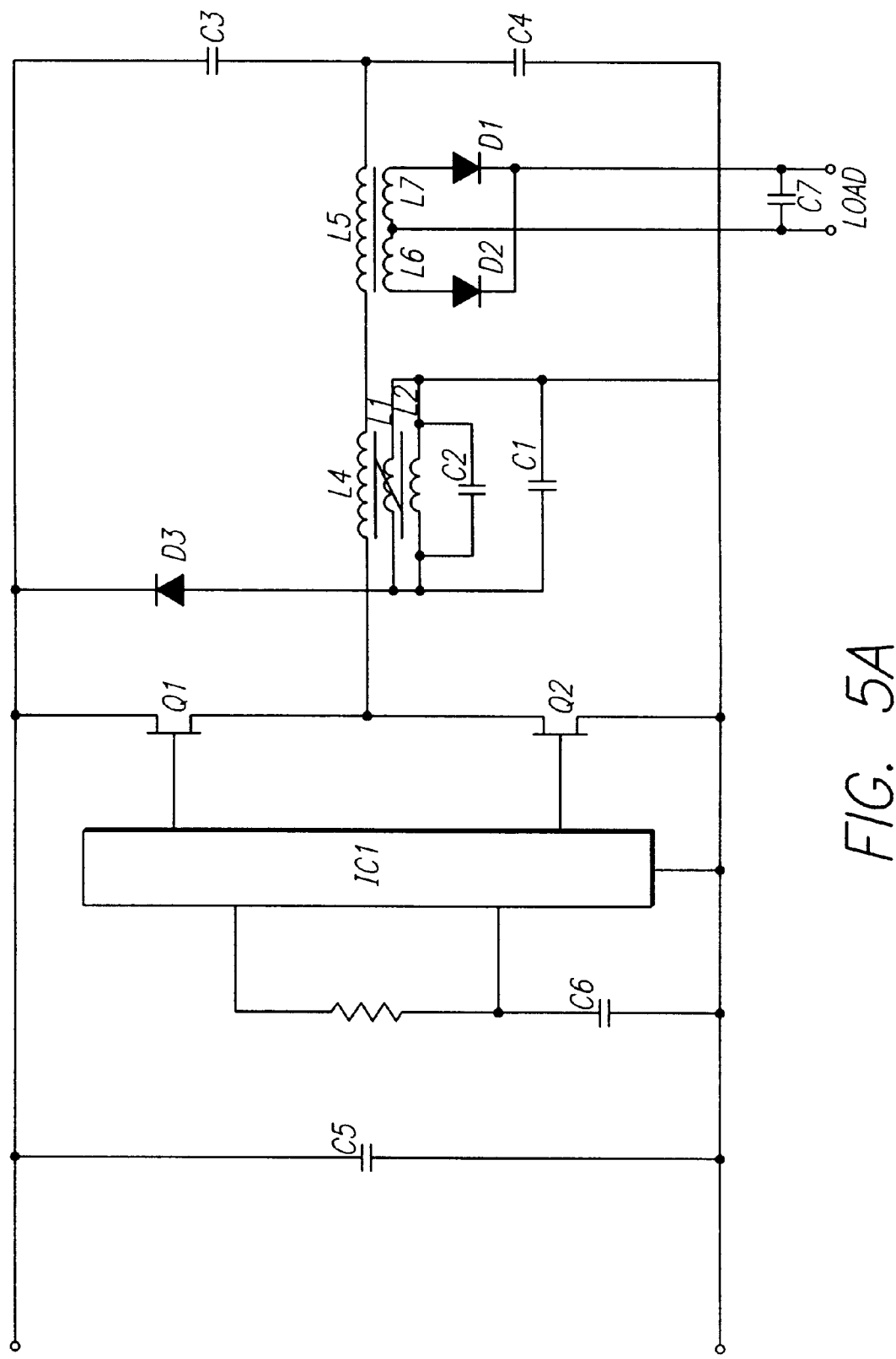
FIGS. 5(a) and 5(b) show circuit diagrams of a preferred embodiment of the present invention.
Figure 5B:
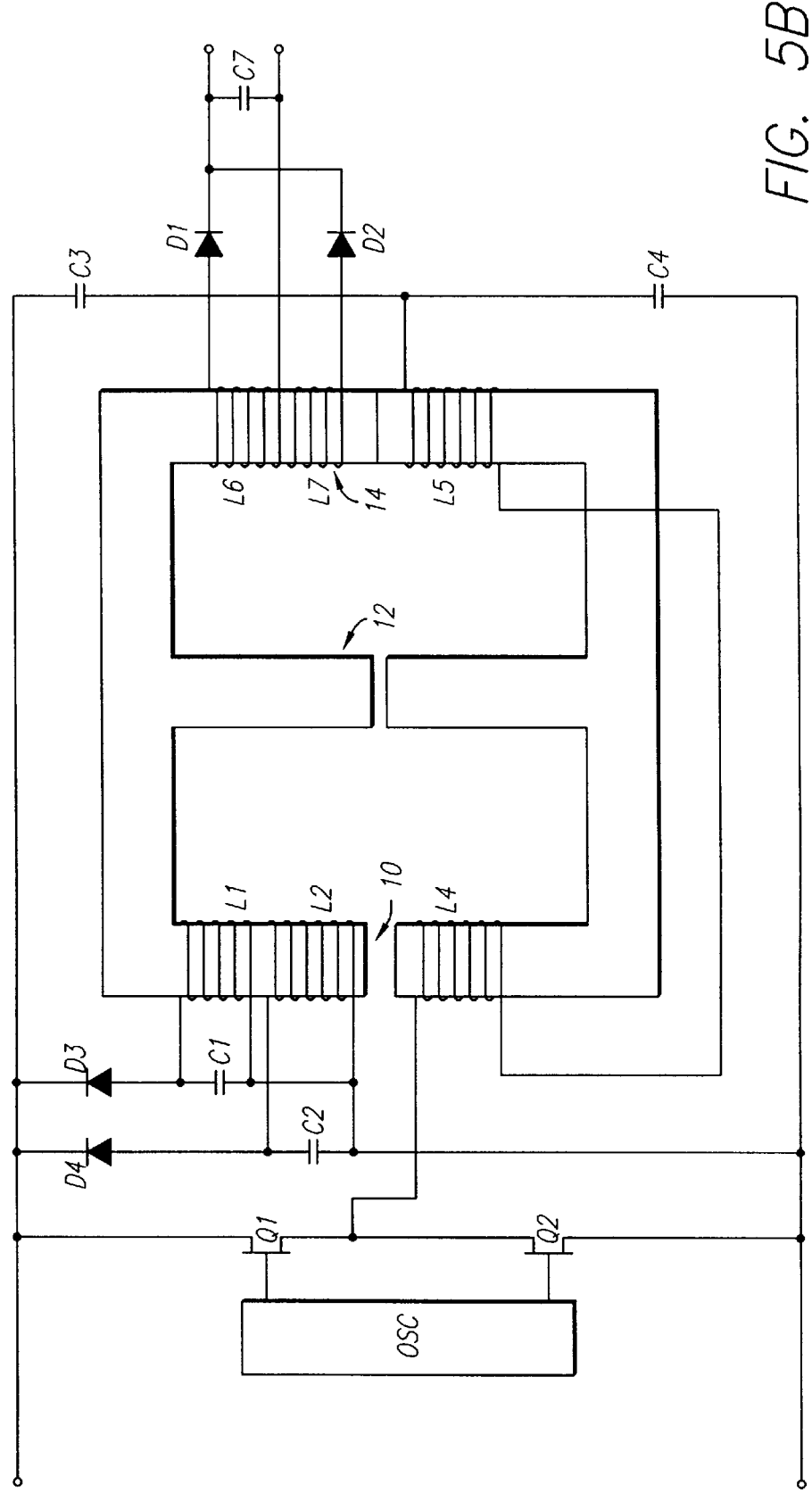

FIGS. 5(a) and 5(b) show a preferred embodiment of the present invention. In this embodiment, a half-bridge implementation is utilized, in which there is only one control winding and one primary winding. Capacitor C5 is a high-frequency filter capacitor used as a bypass for the incoming stabilized DC voltage. Switching transistors Q1 and Q2 are connected into a half-bridge configuration, which is driven by an integrated circuit half-bridge driver IC1 as is common in the practice of power conversion. The half-bridge drive point, between the source of switching transistor Q1 and drain of switching transistor Q2, feeds the control winding L4, which is wound on a common bobbin with two tank windings L1 and L2. In alternative preferred embodiments, there may be any number of tanks windings above two, depending upon the amount of current correction desired.

Control winding L4 and tank windings L1 and L2 are de-coupled on the bobbin, so that there is a significant leakage inductance between the windings. This is accomplished by winding the inductors on different sections of the bobbin, each having its own compartment. A preferred embodiment of a bobbin for use in the present invention is shown in FIG. 6.

Figure 7:
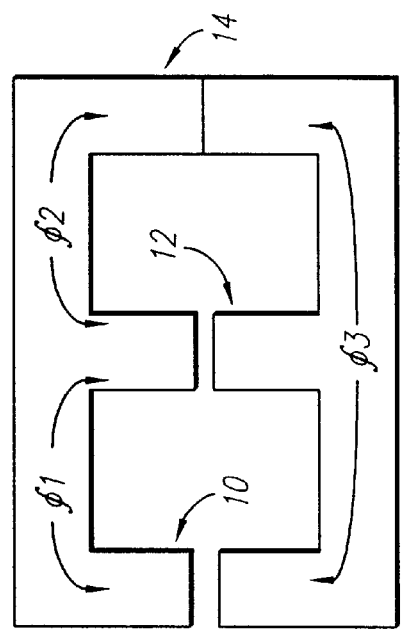
FIG. 7 shows a diagram of the flux paths in the transformer core in a preferred embodiment of the present invention.

Tank windings L1 and L2 have their resonant frequencies separated by approximately 4 kHz. This presents, in the present case, two discrete resonant frequencies on a common core and flux path. The flux paths in a preferred embodiment of the present invention are shown in FIG. 7. As shown in FIG. 7, the core comprises two E-shaped core elements, which are arranged facing each other, such that each leg on one core element is proximate to a corresponding leg on the other core element, producing a first outer leg pair 10, a center leg pair 12, and a second outer leg pair 14. As shown in FIG. 7, there is a gap separating the two legs in the first outer leg pair 10 and the center leg pair 12. In the second outer leg pair 14, the two legs abut each other. The tank and control windings are wound onto the first outer leg pair 10, and the main primary and secondary windings are wound onto the second outer leg pair 14. This creates three flux paths. As shown in FIG. 7, flux path $\phi_1$ passes through the first outer leg pair 10 and the center leg pair 12, flux path $\phi_2$ passes through the center leg pair 12 and the second outer leg pair 14, and flux path $\phi_3$ passes through the first and second outer leg pairs 10, 14.

Figure 6:
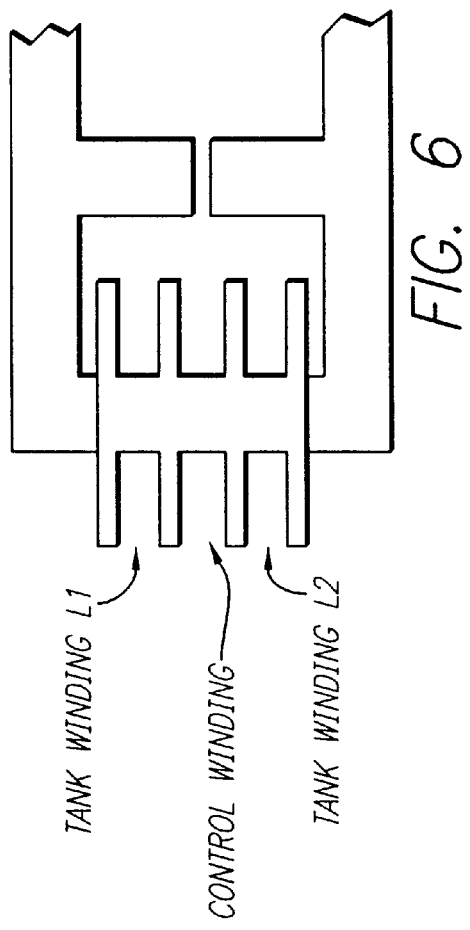
FIG. 6 shows a bobbin for the tank windings and the control winding in a preferred embodiment of the present invention.

Control winding L4 is wound in series with winding L5, the main primary winding, which is wound onto a separate bobbin, and resides on its own core leg pair and resulting flux path, as shown in FIGS. 6 and 7. Secondary windings L6 and L7 are wound out of phase, as is common in half-bridge applications, and feed, respectively, diodes D1 and D2 to achieve rectification of the alternately pulsed current waveform generated by the high-frequency operation of the bridge switching transistors Q1 and Q2 with capacitor C7 filtering the pulsed current for application to the load.

Since all the load current flows through the resonant portion of the core assembly, the load currents are shaped by the sum of the resonant waveforms. The magnetizing current of the L5 winding is the excitation current for the tanks. When the transformer has no load (i.e., no turns ratio imbalance), the only current flowing through the control winding L4 and main winding L5 is a magnetizing current. This current is sufficient to excite the tanks and generate a waveform on each of tank windings L1 and L2 with a frequency respective to the programmed oscillation frequency of the half-bridge drive. The relationship of operating frequency to regulated load current is described in the prior art. In the case of no load, this frequency would be close to resonance, putting the tank flux in a blocking condition.

The operating frequency is programmed by oscillator IC1. The frequency is set to be sufficiently above the highest resonant frequency to keep the tanks from going into resonance, which would cause damage to the converter, but close enough to the highest resonant frequency to allow the tank flux to take the shape of the programmed sine waves. Diode D3 is used to clamp the maximum excursion of the tank during overload on the output and transient voltages, such as those occurring at startup and short circuits.

Figure 3:
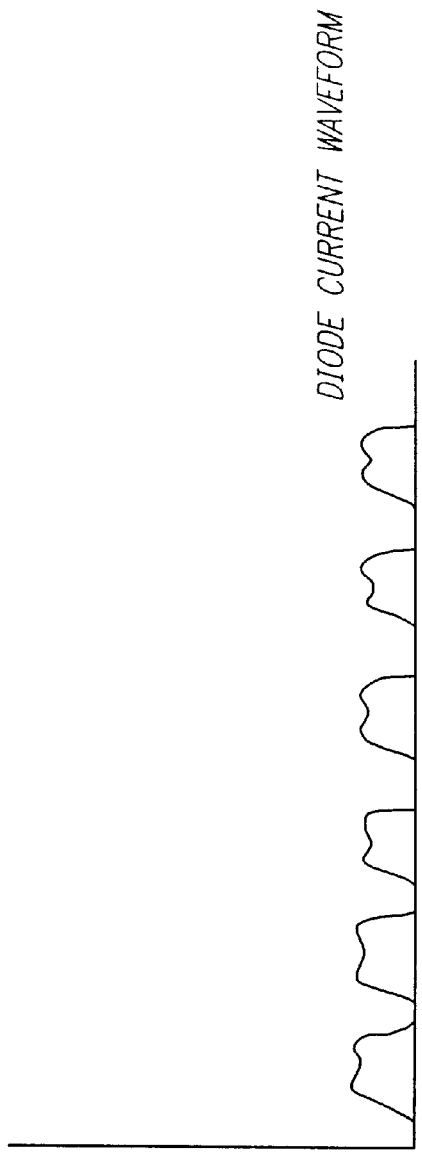
FIG. 3 shows a diode current waveform shape for a preferred embodiment of a resonant converter according to the present invention.
Figure 4:
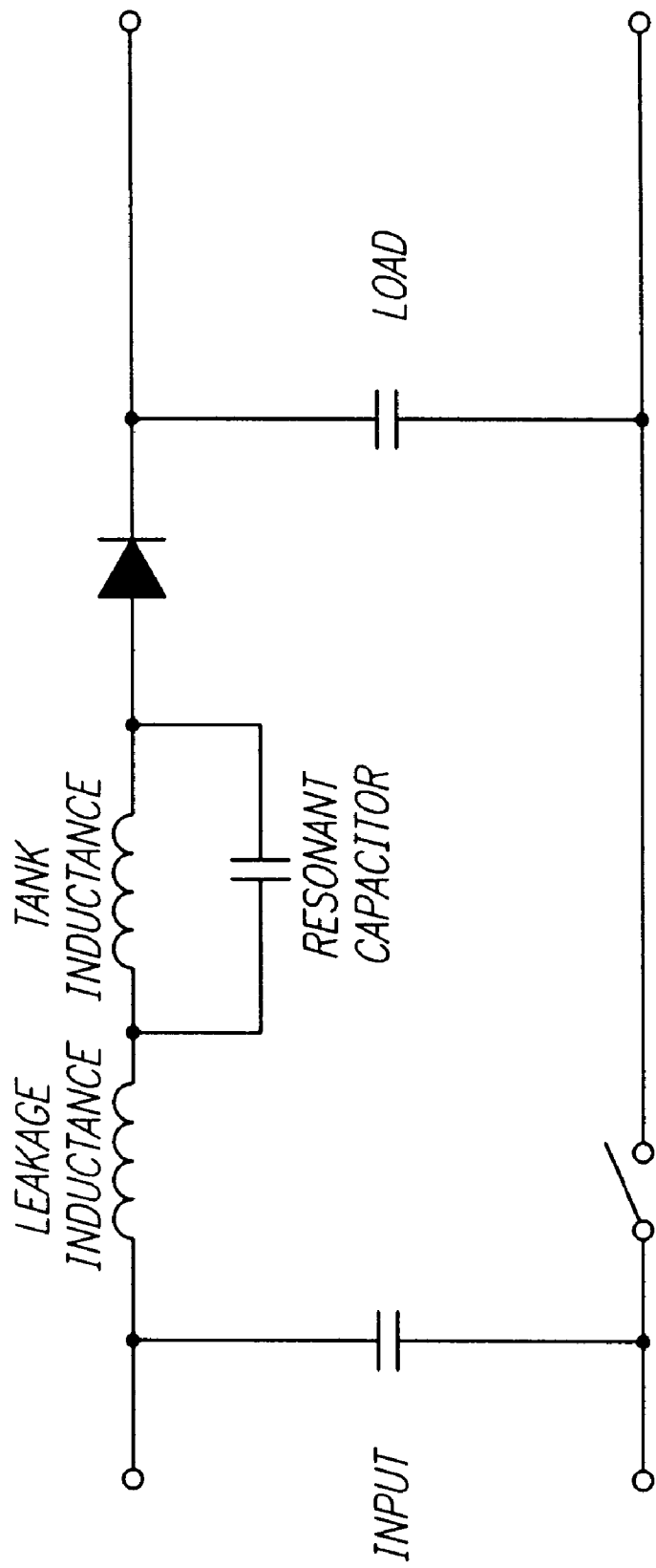
FIG. 4 shows a circuit that is equivalent to a resonant converter circuit.

Since the preprogrammed sine waves are at different frequencies, the core flux to which the tank windings are coupled takes the shape of both resonant frequencies. The combined waveform is shown in FIG. 3. All the load current flowing in the secondary windings L6, L7 must flow through the control winding L4, which is in series with primary L5. The tank flux therefore imparts control over the load currents as a function of the flux shape in the core flux path $\phi_1$, as shown in FIG. 7.

FIG. 5(b) shows the preferred embodiment of FIG. 5(a) redrawn to show a preferred configuration of windings L1, L2, L4, L5, L6 and L7 on the two core elements.

In conclusion, it is possible to impart on the current in the DC-to-DC converter the waveshape of a resonant network. Manipulation of the network will yield a modified waveshape, which can reduce the RMS value of the waveform to below its previous unmodified shape and thus increase the operating efficiency and density of the converter.

While the foregoing description includes detail which will enable those skilled in the art to practice the invention, it should be recognized that the description is illustrative in nature and that many modifications and variations will be apparent to those skilled in the art having the benefit of these teachings. It is accordingly intended that the invention herein be defined solely by the claims appended hereto and that the claims be interpreted as broadly as permitted in light of the prior art.

What is claimed is:

1. A DC-to-DC converter, comprising:

inverter means for receiving a DC input and providing as an output a high-frequency, alternately pulsed current waveform;

a control winding for receiving the output of the inverter means, the control winding being wound on a common bobbin with first and second tank windings, the windings de-coupled on the bobbin so that there is a significant leakage inductance between the windings, the first and second tank windings having two discrete resonant frequencies on a common core and flux path, a main primary winding wound in series with the control winding, the main primary winding being wound onto a separate bobbin and residing on its own core leg and flux path, first and second secondary windings coupled with the main primary winding, the first and second secondary windings being wound out of phase with each other, the first and second secondary windings feeding, respectively, first and second diodes, the first and second diodes rectifying the alternately pulsed current waveform generated by high-frequency operation of the inverter means.

2. A DC-to-DC converter according to claim 1, in which the resonant frequencies of the first and second tank windings are separated by approximately 4 kHz.

3. A DC-to-DC converter according to claim 1, wherein the control winding, the first and second tank windings, the main primary winding, and the first and second secondary windings are wound onto first and second E-shaped core elements, the first E-shaped core element being disposed relative to the second E-shaped core element such that each leg of the first core element is proximate to a corresponding leg of the second core element, forming a first outer leg pair, a center leg pair, and a second outer leg pair, the control winding and the first and second tank windings being wound onto the first outer leg pair, and the main primary winding and the first and second secondary windings being wound onto the second outer leg pair.

* * * * *